(12) United States Patent
Lailach

(10) Patent No.: US 6,346,227 B1
(45) Date of Patent: Feb. 12, 2002

(54) PROCESS FOR PREPARING PURE HYDROFLUORIC ACID

(75) Inventor: Günther Lailach, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/498,166

(22) Filed: Feb. 4, 2000

(30) Foreign Application Priority Data

Feb. 12, 1999 (DE) .......................................... 199 05 798

(51) Int. Cl.[7] .................................................. C01B 7/19
(52) U.S. Cl. ........................ 423/484; 423/483; 423/488
(58) Field of Search ................... 423/483, 484, 423/488

(56) References Cited

U.S. PATENT DOCUMENTS

| | | | | |
|---|---|---|---|---|
| 1,892,652 A | * | 12/1932 | Heath | 423/488 |
| 2,507,605 A | * | 5/1950 | Lopker et al. | 423/488 |
| 4,032,621 A | * | 6/1977 | Meadows | 423/483 |
| 4,083,941 A | * | 4/1978 | Jayawant et al. | 423/488 |
| 4,668,497 A | | 5/1987 | Miki | 423/484 |
| 5,108,559 A | | 4/1992 | Motz et al. | 204/96 |
| 5,785,820 A | | 7/1998 | Hoffman et al. | 202/158 |
| 6,183,720 B1 | * | 2/2001 | Laederich et al. | 423/484 |

FOREIGN PATENT DOCUMENTS

| | | |
|---|---|---|
| AU | 266930 | 5/1966 |
| CS | 240051 | 7/1987 |
| DE | 870729 | 10/1998 |
| EP | 430401 | 6/1991 |
| GB | 1192474 | 5/1970 |
| WO | WO 96/39264 | 12/1996 |
| WO | WO 96/39266 | 12/1996 |

* cited by examiner

Primary Examiner—Ngoc-Yen Nguyen
(74) Attorney, Agent, or Firm—Joseph C. Gil; Diderico van Eyl

(57) ABSTRACT

The novel process for preparing pure hydrofluoric acid or pure hydrogen fluoride is characterized in that, after pretreatment by distillatioil/oxidation, a two-stage scrub is carried out using 65–90% strength by weight hydrofluoric acid and 90–100% strength by weight hydrofluoric acid and water is fed into the first or second scrubbing circuit and a corresponding amount of hydrofluoric acid is bled off to remove impurities.

8 Claims, 1 Drawing Sheet

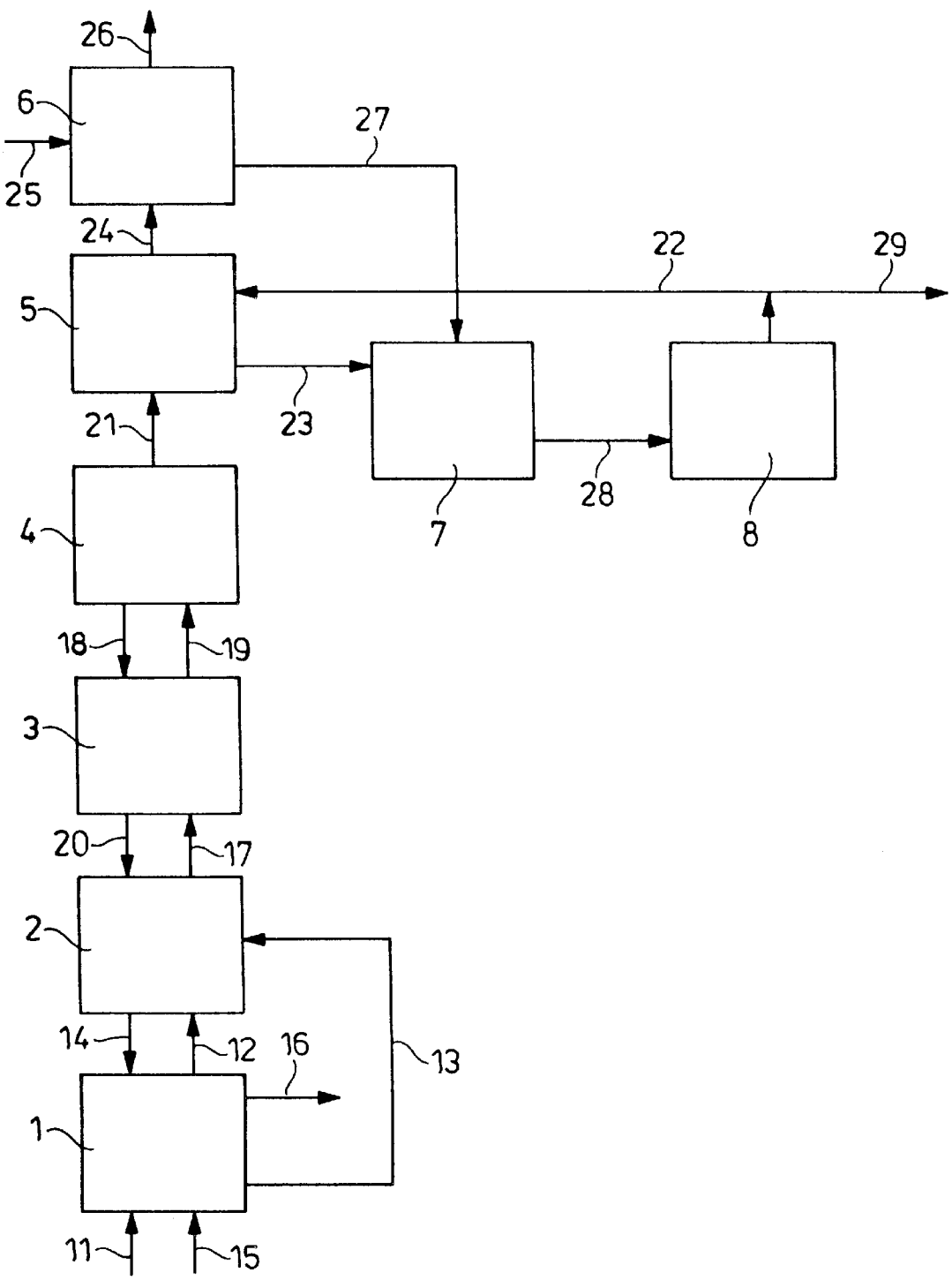

PROCESS FOR PREPARING PURE HYDROFLUORIC ACID

BACKGROUND OF THE INVENTION

The invention relates to a process for preparing pure hydrofluoric acid or pure hydrogen fluoride from technical-grade hydrogen fluoride. In the production of hydrogen fluoride by reaction of fluorspar with sulphuric acid, the technical-grade hydrogen fluoride which is condensed contains, as secondary constituents, $SO_2$, $H_2SO_4$, $H_2O$, $SiF_4$, $PF_3$, $POF_3$, $PF_5$, $BF_3$, $AsF_3$ and other metal fluorides. Distillation enables both the low boilers $SiF_4$, $PF_3$, $POF_3$, $PF_5$, $BF_3$ and $SO_2$, and the high boilers $H_2SO_4$, $H_2O$ and other metal fluorides to be largely removed from the hydrogen fluoride. The main problem is the removal of the high boiler $AsF_3$ which is difficult to bring down below 1 ppm (calculated as As) by distillation. The removal of As can be aided by oxidizing the trivalent As to pentavalent As prior to the high boiler distillation, e.g. by means of $KMnO_4$, electrolytically or by means of fluorine (cf. AU 266 930, U.S. Pat. No. 5,108,559, U.S. Pat. No. 4,668,497). The hydrogen fluoride produced in this way is very pure but does not yet meet the high purity requirements of the electronics industry or analytical chemistry in respect of all parameters. The main problems are residual contents of $SiF_4$ and of $SO_2$ which can be oxidized to $H_2SO_4$ on mixing the HF with water. If the removal of high boilers is carried out in inexpensive steel apparatus instead of in very expensive, fluoropolymer-lined apparatus, increased heavy metal fluoride concentrations also have to be expected. Similarly, the storage of high-purity hydrogen fluoride before mixing with water requires expensive lined tanks.

As an alternative, the hydrogen fluoride can be mixed with water after the removal of the low boilers and the trivalent As in the aqueous hydrofluoric acid can be oxidized to pentavalent As, e.g. by means of $KMnO_4$ (cf. GB 1 192 474; CS 240 051). The purification of this aqueous hydrofluoric acid by distillation likewise requires lining of the apparatus with expensive fluorinated polymers. However, the high working temperatures in the range from 90 to 110° C. present a problem because the diffusion rate of HF through the lining materials increases sharply with rising temperature, so that damage to the apparatus can result. A further problem is the disposal of the metal fluoride-containing distillation residues which consist essentially of 40% strength HF and represent a relatively large proportion of the hydrofluoric acid used.

An object of the process of the invention is the reliable and economical preparation of pure hydrofluoric acid or pure hydrogen fluoride while avoiding the disadvantages of the known processes.

SUMMARY OF THE INVENTION

The present invention accordingly provides a process for preparing pure hydrofluoric acid or pure hydrogen fluoride from technical-grade hydrogen fluoride having an HF content of at least 97% by weight by a) removal of low-boiling impurities by distillation, b) subsequent oxidation of trivalent arsenic compounds to pentavalent arsenic compounds and, if desired, c) removal of the high-boiling impurities by distillation, characterized in that the hydrogen fluoride obtained either after step b) or after step c) is subjected to a two-stage scrub, in the first stage with 65–90% strength by weight hydrofluoric acid and in the second with 90–100% strength by weight hydrofluoric acid or hydrogen fluoride, with simultaneous cooling to from 10° C. to 30° C., and a small amount of water is fed into the first or second scrubbing circuit and a corresponding amount of 65–90% strength by weight hydrofluoric acid is bled off to remove impurities which are still present.

DESCRIPTION OF THE FIGURES

These and other features, aspects, and advantages of the present invention will become better understood with reference to the following description and appended claims; where FIG. 1 is a flow chart that illustrates a preferred embodiment of the invention.

DESCRIPTION OF THE INVENTION

The removal of low-boiling impurities by distillation in stage a) is carried out in a known manner in steel apparatus, with the low boilers $SiF_4$, $PF_3$, $POF_3$, $PF_5$, $BF_3$ and most of the $SO_2$ being removed. Step a) is preferably carried out at atmospheric pressure and a temperature of from 20 to 23° C.

In stage b), trivalent As, which is present as $AsF_3$, is oxidized completely to pentavalent As in the form of $AsF_5$ either electrolytically or by passing $F_2$ into the liquid hydrogen fluoride. In step b), preference is given to using steel apparatus; the temperature is generally from 10 to 20° C. and the pressure is about ambient pressure.

Step c) can likewise be carried out in conventional steel apparatus, with hydrogen fluoride being taken off at the top at temperatures of from 20 to 23° C. and high-boiling impurities such as $HAsF_6$, $H_2SO_4$, $H_2O$ and metal fluorides formed from $AsF_5$ and HF remaining in the bottoms.

The two-stage scrub following step b) or c) is, according to the invention, carried out in a steel apparatus lined with fluorinated polymers (e.g. perfluoroalkoxy) at a pressure of from 0.5 to 1.1 bar (abs.). The hydrogen fluoride is vaporized and is scrubbed first with circulated 65–90% strength hydrofluoric acid at from 20 to 80° C., preferably with 70–85% strength hydrofluoric acid at from 20 to 60° C., and then with 90–100% strength, preferably 95–99.5% strength, hydrofluoric acid or hydrogen fluoride, with simultaneous cooling to from 10 to 30° C. The impurities introduced with the hydrogen fluoride are discharged from the system by feeding a small amount of water into the first or second scrub and bleeding off a corresponding amount of 65–90% strength hydrofluoric acid. This amount of water is from 1 to 10%, preferably from 1 to 5%, of the amount of HF fed into the system.

After prepurification of the hydrogen fluoride in steps a), b) and c), it still contains, in particular, $SO_2$ and Fe impurities in amounts of from 2 to 5 ppm and from 0.3 to 2 ppm, respectively, and $HAsF_6$ in an amount of from 5 to 30 ppb (as As).

If the two-stage scrub directly follows step b), the high-boiling impurities and $HAsF_6$ are removed in addition to the abovementioned impurities in the first or second scrubbing circuit.

The twice-scrubbed hydrogen fluoride gas is passed through a condenser in which from 25 to 90% of the gas introduced is condensed and recirculated as liquefied gas to the second scrub.

The twice-scrubbed, pure hydrogen fluoride gas leaving the condenser can either be liquefied in a further condenser so as to be used as anhydrous pure hydrogen fluoride or be absorbed in hydrofluoric acid , with the concentration of the hydrofluoric acid being able to be set in the range from 10 to 85% HF, preferably from 40 to 75% HF, by addition of high-purity water.

The process of the invention gives very pure hydrogen fluoride or hydrofluoric acid.

Analysis of a 50% strength hydrofluoric acid (customary commercial form) prepared according to the invention gives the following values:

| | | |
|---|---|---|
| $H_2SiF_6$ | <30 ppm, preferably | <10 ppm |
| $H_2SO_4 + H_2SO_3$ | <1 ppm, preferably | <0.5 ppm |
| $HNO_3$ | <3 ppm, preferably | <1 ppm |
| $H_3PO_4$ | <100 ppm, preferably | <50 ppm |
| As | <10 ppb, preferably | <8 ppb |
| Fe | <50 ppb, preferably | <10 ppb |

The process of the invention will now be illustrated by means of a preferred embodiment as outlined in FIG. 1.

The hydrogen fluoride 1 which has been prepurified in steps a), b) and, if desired, c) and may contain $As^{5+}$ is introduced either directly in gaseous form or as liquefied gas into the vaporizer (1) which is advantageously configured as the bottom of the scrubber I (2). Gaseous hydrogen fluoride and water vapor (12) flow into the scrubber I (2) in which they are scrubbed with 65–90% strength, preferably 70–95% strength, hydrofluoric acid (13). The hydrofluoric acid (13) is pumped by means of a pump from the vaporizer (1) into the scrubber I (2) and from the latter flows (14) back into the vaporizer (1). To avoid accumulation of secondary constituents which are introduced with the hydrogen fluoride (11), a small amount of water (15) is fed into the vaporizer (1) and a corresponding amount of 65–90% strength hydrofluoric acid (16) in which the secondary constituents are present is bled off. As an alternative, the water (15) can be fed into the scrubber II (3).

From the scrubber I (2), the hydrogen fluoride/water vapor mixture (17) which has been scrubbed with 65–90% strength hydrofluoric acid (13) flows into the scrubber II (3) in which it is scrubbed with 90–100% strength hydrofluoric acid or hydrogen fluoride (18). The scrubbing medium (18) is produced by condensing from 25 to 90% of the twice-scrubbed, water vapor-containing HF gas stream (19) in the condenser (4). Any hydrofluoric acid (20) which has not been vaporized in the scrubber II (3) flows via the scrubber I (2) into the vaporizer (1) in which the HF present is preferably vaporized.

The hydrogen fluoride stream (21) leaving the condenser (4), which is highly pure after being scrubbed twice and partly condensed, is conveyed to an absorber (5) in which the HF is absorbed in aqueous 10–85% strength, preferably 40–75% strength, hydrofluoric acid (22). The warmed hydrofluoric acid (23) flowing from the absorber (5) into a reservoir (7) is circulated (28) via a cooler (8). HF (24) which has not been absorbed is conveyed from the absorber (5) to a scrubber (6) which is supplied with the amount of high-purity water (25) required to maintain the desired hydrofluoric acid concentration in the reservoir (7). From the scrubber (6), a minimal waste gas stream (26) is passed to an alkaline HF absorber. The greatly diluted hydrofluoric acid (27) flowing from the scrubber (6) is conveyed to the reservoir (7) from which the pure hydrofluoric acid (29) produced is drawn off.

The process of the invention offers a number of advantages over the prior art:

The low-boiler distillation and the As oxidation as well as any high-boiler distillation of the hydrogen fluoride are carried out in conventional steel apparatus at about 20° C.

The double scrub of the pretreated hydrogen fluoride with 65–90% strength and 90–100% strength hydrofluoric acid is carried out at temperatures in the range from 10 to 80° C., preferably from 10 to 60° C., at which the diffusion rate of HF through the lining materials is comparatively low.

The amount of hydrogen fluoride discharged as contaminated hydrofluoric acid from scrub I represents a small proportion of the total throughput. The proportion is in the range from 5 to 20% if no high-boiler distillation is carried out and in the range from 2 to 10% if the hydrogen fluoride has been additionally prepurified by high-boiler distillation.

The double scrub gives highly pure HF gas from which hydrofluoric acid of any concentration can be produced in the adsorption plant or anhydrous hydrogen fluoride can be condensed.

The examples, referring to FIG. 1, illustrate the advantages of the invention without restricting its scope.

EXAMPLE 1

Technical-grade hydrogen fluoride is distilled at ambient pressure in a low-boiler column made of steel. The hydrogen fluoride taken off from the bottom of the column contains:

| |
|---|
| 30 ppm $H_2SO_4$, |
| 3 ppm $SO_2$, |
| 85 ppm $H_2O$, |
| 18 ppm As, |
| 12 ppm Si, |
| 0.2 ppm P. |

Passing in 7l of $F_2$ per tonne of hydrogen fluoride oxidizes the $AsF_3$ to $AsF_5$ which reacts with HF to form $HAsF_6$. Subsequently, the hydrogen fluoride is distilled at ambient pressure in a column (likewise of steel) to remove the high boilers. Prepurified hydrogen fluoride having the following composition is obtained at the top of the column:

| |
|---|
| 1 ppm $H_2SO_4$, |
| 3 ppm $SO_2$, |
| 25 ppm $H_2O$, |
| 16 ppb As, |
| 12 ppm Si, |
| <0.1 ppm P, |
| 0.4 ppm Fe. |

The prepurified hydrogen fluoride produced at a rate of 3.3 tonnes/h is stored in a steel tank from which the plant for preparing highly pure hydrofluoric acid, which is operated at ambient pressure, is supplied.

515 kg/h of prepurified hydrogen fluoride (1) and 2.5 l/h of high-purity water (15) are fed into the vaporizer (1). In the vaporizer (1) which is heated by means of about 225 kg/h of 5 bar steam, a temperature of 42° C. is established at ambient pressure. From the vaporizer, 17.5 kg/h of about 85% strength hydrofluoric acid in which the scrubbed-out impurities $H_2SO_4$, $H_2SiF_6$, $FeF_2$ etc. are present are taken off (16). 500 kg/h of HF vapor (12) flow from the vaporizer (1) into the superposed packed scrubber I (2) where the HF vapor is scrubbed with 2 m³/h of 85% strength hydrofluoric acid (13) which is pumped by means of a pump into the top section of the scrubber I.

Superposed on the scrubber I (2) is the scrubber II (3) through which the 500 kg/h of HF vapor (17/19) flow into the condenser (4). Here, 950 kg/h of HF (having an $H_2O$ content of about 0.5%) are condensed by means of cold water cooling and are distributed as scrubbing medium (18) over the column packing of the scrubber II.

From the scrubber II, a small amount (20) of hydrofluoric acid flows into the scrubber I.

The high-purity hydrogen fluoride gas (21) which is not condensed in the condenser (4) is conveyed to the absorber (5) in which it is absorbed in 6 tonnes/h of 60% strength hydrofluoric acid which are fed into the absorber at 25° C. (22).

From the absorber, 6.5 tonnes/h of 63% strength hydrofluoric acid (23) at 42° C. flow into the reservoir (7). The scrubber (6) downstream of the absorber (5) is supplied with 333 l/h of high-purity water (25) which after absorbing HF likewise flows (27) into the reservoir (7). The hydrofluoric acid is warmed to about 48° C. as a result. From the reservoir (7), the 60% strength hydrofluoric acid (28) is passed through the cooler (8) in which it is cooled to 25° C. 6 tonnes/h of the cooled acid are fed (22) into the absorber (5) and 833 kg/h are passed to the storage tank as high-purity hydrofluoric acid product (29).

The hydrofluoric acid produced typically has the following analysis:

<10 ppm $H_2SiF_6$

<0.5 ppm ($H_2SO_4+H_2SO_3$)

<1 ppm HNO3

30–50 ppb $H_3PO_4$

6–8 ppb As

1–10 ppb Fe

Although the present invention has been described in detail with reference to certain preferred versions thereof, other variations are possible. Therefore, the spirit and scope of the appended claims should not be limited to the description of the versions contained therein.

EXAMPLE 2

Using the procedure described in Example 1, technical-grade hydrogen fluoride is distilled in a low-boiler column and $AsF_3$ is oxidized to $AsF_5$ by passing $F_2$ into it. 540 kg/h of the hydrogen fluoride (11) which has been pretreated in this way are fed into the vaporizer (1). At the same time, 13 l/h of water (15) are fed in and 53 kg/h of about 75% strength hydrofluoric acid (16) containing 350 ppm of $H_2SO_4$, 435 ppm of $H_2SiF_6$, 192 ppm of $As^{5+}$ and 12 ppm of $Fe^{2+}$ are taken off. From the vaporizer, which is operated at ambient pressure, the vapor (12) at 63° C. flows through the scrubber I (2), in which it is scrubbed with 2 m³ of 75% strength hydrofluoric acid (13) which flows (14) from the scrubber I back into the vaporizer.

The scrubbed HF vapor flows (17) into the scrubber II (3) in which it is scrubbed by means of 1500 kg/h of HF (containing about 1% of water) (18) and is cooled from 63 to 22° C.

From the scrubber II, 2000 kg/h of HF gas (19) flow into the condenser (4) in which the partial condensation of 1500 kg/h of HF occurs; this condensate flows (18) into the scrubber II (3). The highly pure HF gas (21) leaving the condenser is worked up to produce 60% strength hydrofluoric acid using the procedure described in Example 1.

The hydrofluoric acid had the following analysis:

<10 ppm $H_2SiF_6$

<0.5 ppm ($h_2SO_4$ +$H_2SO_3$)

<1 ppm $HNO_3$

30–50 ppb $H_3PO_4$

6–10 ppb As

1–10 ppb Fe

Although the present invention has been described in detail with reference to certain preferred versions thereof, other variations are possible. Therefore, the spirit and scope of the appended claims should not be limited to the description of the versions contained therein.

What is claimed is:

1. Process for preparing pure hydrofluoric acid or pure hydrogen fluoride from technical grade hydrogen fluoride having an HF content of at least 97% by weight, the process comprising the steps of
    a) removing low-boiling impurities by distillation from the technical grade hydrogen fluoride,
    b) subsequently oxidizing trivalent arsenic compounds in the resulting hydrogen fluoride to pentavalent arsenic compounds,
    wherein hydrogen fluoride obtained after step b) is subjected to a two-stage scrub, in the first stage with 65–90% strength by weight hydrofluoric acid and in the second stage with 90–100% strength by weight hydrofluoric acid, with simultaneous cooling to a temperature from 10° C. to 30° C., and a small amount of water is fed into the first or second scrubbing stage and a corresponding amount of 65–90% strength by weight hydrofluoric acid is bled off to remove impurities from the two-stage scrub, and a portion of the twice scrubbed hydrogen fluoride is recovered as the pure hydrofluoric acid or the pure hydrogen fluoride.

2. Process according to claim 1, wherein in the first stage 70–85% strength by weight hydrofluoric acid is used.

3. Process according to claim 1, wherein in the second stage 95–99.5% strength by weight hydrofluoric acid is used.

4. Process according to claim 1, wherein from 25 to 90% of the twice scrubbed hydrogen fluoride is condensed and used as scrubbing medium in the second stage.

5. Process according to claim 1, wherein the pure hydrogen fluoride is absorbed in 40–75% strength by weight hydrofluoric acid.

6. Process according to claim 1, wherein the two-stage scrub is carried out at a pressure of from 0.5 to 1.1 bar.

7. Process according to claim 1, wherein the two-stage scrub of the HF is carried out in a steel apparatus which is lined with fluorine-containing polymers.

8. The process of claim 1, wherein the process further comprises the step c) that includes removing high-boiling impurities in the hydrogen fluoride obtained after step b) by distillation, wherein hydrogen fluoride obtained after step c) is subjected to said two-stage scrub.

* * * * *